United States Patent [19]
Goldenfield et al.

[11] Patent Number: 4,822,987
[45] Date of Patent: Apr. 18, 1989

[54] METHOD AND APPARATUS FOR PROVIDING FUEL ROD IDENTIFICATION TO PERMIT TRACEABILITY DURING MANUFACTURE AND USE

[75] Inventors: Mark P. Goldenfield, Columbia; David V. Lambert, St. Matthews; Hassan J. Ahmed, Columbia, all of S.C.

[73] Assignee: Westinghouse Electric Corp., Pittsburgh, Pa.

[21] Appl. No.: 148,326

[22] Filed: Jan. 25, 1988

[51] Int. Cl.$^4$ ........................ G06K 1/12; G06K 19/06
[52] U.S. Cl. ................................ 235/462; 235/487; 235/385; 346/76 L; 376/450; 376/452
[58] Field of Search ............... 235/375, 376, 383, 385, 235/462, 464, 467, 470, 487, 491; 346/76 L, 138; 369/273, 260, 292, 100, 109; 376/409, 412, 440, 450, 451, 452, 457, 901, 463; 250/555, 570, 566, 567; 219/121.63, 121 L, 121 LC, 121 LD, 121 LH, 121 LJ; 29/723, 722; 364/562

[56] References Cited
U.S. PATENT DOCUMENTS

| | | | |
|---|---|---|---|
| 3,632,205 | 1/1972 | Marcy | 355/53 |
| 3,679,828 | 7/1972 | Becky | 178/7.6 |
| 3,747,959 | 7/1973 | Hunt | 283/7 |
| 3,828,518 | 8/1974 | Silk et al. | 376/409 |
| 3,902,048 | 8/1975 | Fleischer et al. | 235/61.11 E |
| 3,928,759 | 12/1975 | Sansone | 250/568 |
| 3,931,524 | 1/1976 | Herrin | 250/566 |
| 4,010,355 | 3/1977 | Roehrman et al. | 235/462 |
| 4,019,026 | 4/1977 | Nakanishi et al. | 235/61.11 E |
| 4,024,545 | 5/1977 | Dowling et al. | 346/76 L |
| 4,109,143 | 8/1978 | Yamaguchi et al. | 235/462 |
| 4,143,809 | 3/1979 | Uebbing et al. | 235/462 |
| 4,323,755 | 4/1982 | Nierenberg | 346/76 L |
| 4,406,939 | 9/1983 | Golker | 219/121 LJ |
| 4,534,313 | 8/1985 | Louvel | 346/76 L |
| 4,547,649 | 10/1985 | Butt et al. | 219/121 LF |
| 4,587,407 | 5/1986 | Ahmed et al. | 235/467 |
| 4,625,396 | 12/1986 | Ahmed et al. | 376/463 |
| 4,636,846 | 1/1987 | Villarreal | 358/100 |
| 4,649,632 | 3/1987 | Schoenig et al. | 376/463 |
| 4,659,544 | 4/1987 | Sawayama et al. | 376/450 |
| 4,701,869 | 10/1987 | Callegari et al. | 364/562 |

FOREIGN PATENT DOCUMENTS

59-97094  6/1984  Japan ................................ 376/452

Primary Examiner—Alan Faber
Assistant Examiner—Robert A. Weinhardt

[57] ABSTRACT

In a nuclear fuel rod identification system, indicia is provided on a nuclear fuel rod in two stages. In the first stage, by use of a laser beam a bar code is applied directly on the fuel rod cladding tube prior to loading it with nuclear fuel and attaching plugs to opposite ends thereof to provide an assembled fuel rod. In the second stage, after loading nuclear fuel into and attaching end plugs to opposite ends of the fuel rod cladding tube with the applied bar code to provide an assembled fuel rod, by use of a laser beam, identification and enrichment symbologies are applied respectively to the side and end of one of the end plugs of the assembled fuel rod.

42 Claims, 9 Drawing Sheets

METHOD AND APPARATUS FOR PROVIDING FUEL ROD IDENTIFICATION TO PERMIT TRACEABILITY DURING MANUFACTURE AND USE

CROSS REFERENCE TO RELATED APPLICATION

Reference is hereby made to the following copending application dealing with related subject matter and assigned to the assignee of the present invention: "Method and Apparatus for Reading Lased Bar Codes on Shiny-Finished Fuel Rod Cladding Tubes" by Mark P. Goldenfield, assigned U.S. Ser. No. 152,288 and filed 2/4/88.

BACKGROUND OF THE INVENTION

1. Field of the Invention

The present invention relates generally to nuclear fuel rod identification and traceability and, more particularly, is concerned with a method and apparatus for providing fuel rod identification to permit individual fuel rod traceability during manufacture and use.

2. Description of the Prior Art

Various techniques have been proposed in the past to identify specific nuclear fuel rods for different purposes. For instance, in U.S. Pat. No. 3,747,959, physical markings, such as indentations or notches, are used for object identification. In U.S. Pat. No. 4,636,846, fuel rods are stamped with indicia in the form of a character code prior to insertion into the reactor for the purpose of identifying each fuel rod upon removal after irradiation.

Bar code labels used for identifying retail products have also been used for identification of nuclear fuel rods. For instance, in U.S. Pat. No. 4,587,407, bar code labels are affixed to nuclear fuel rod claddings which contain information such as an individual identification number assigned to the particular fuel rod. The bar code is adapted to be optically scanned and read to determine its assigned number. The bar code labels were employed for traceability of a fuel rod during its manufacture. The labels are manually applied at the start of the manufacturing process and manually removed at the end. Thus, there was no continued traceability of individual fuel rods after completion of manufacturing.

The use of bar codes would appear to have great promise for identification and traceability of individual fuel rods. However, their application on labels has shortcomings. The labels are costly to apply and remove. The labels will not stay on while the fuel rods are in use in a nuclear reactor.

Up to the present time, none of the prior techniques have addressed the traceability of individual fuel rods in a totally comprehensive manner. Consequently, a need exists for a comprehensive approach to identification of fuel rods so that individual fuel rods can be traced during any stage in their manufacture and use.

SUMMARY OF THE INVENTION

The present invention provides a method and apparatus for providing identification indicia on an individual fuel rod which method and apparatus are designed to satisfy the aforementioned needs. The method and apparatus of the present invention provide a comprehensive approach to individual fuel rod identification permitting traceability of individual fuel rods during all stages of both manufacture and use.

The preferred embodiments of the method and apparatus, as disclosed herein, include several improved features which meet the aforementioned needs. While the improved features are particularly adapted to be employed together in providing the aforementioned comprehensive approach to fuel rod traceability, it is readily apparent that certain of such features may also be employed separately. Some of the several improved features comprise the invention claimed in the copending application cross-referenced above; however, all of the improved features are illustrated and described herein for facilitating a complete and thorough understanding of those of the features comprising the present invention.

The present invention relates to the method and apparatus employed both at the separate successive stages and in the overall sequence thereof for providing identification indicia on individual fuel rods which permits for their traceability during both manufacture and use.

Accordingly, the present invention is set forth in a nuclear fuel rod identification system and directed to a method and apparatus for providing identification indicia on fuel rods which comprise the operative steps of: (a) applying a bar code on a fuel rod cladding tube prior to loading it with nuclear fuel and attaching plugs to opposite ends thereof to provide an assembled fuel rod; and (b) after loading nuclear fuel into and attaching end plugs to opposite ends of the fuel rod cladding tube having the bar code applied thereon to provide an assembled fuel rod, applying identification symbology to one of the end plugs of the assembled fuel rod.

More particularly, the operative step in the indicia providing method and apparatus of applying the bar code on a fuel rod cladding tube end portion includes: positioning a fuel rod cladding tube with its end portion extending into a sealed chamber of a workstation; maintaining a gaseous atmosphere consisting of an argon-oxygen mixture within the sealed chamber; and engraving a bar code directly on a circumferential surface portion of the cladding tube end portion. The engraving step includes rotating the fuel rod cladding tube, and simultaneously with the rotating, etching a bar code directly on the circumferential surface portion of the cladding tube end portion by using the beam of a laser.

Furthermore, the engraving step includes laser etching the bar code directly on spaced circumferential surface portions of the cladding tube end portion with each bar code being circumferentially spaced apart and covering slightly less than 120 degrees each. Also, the maintaining step includes keeping argon within the range of 45–85 percent and oxygen within the range of 15–55 percent.

The other operative step in the indicia providing method and apparatus of applying symbology on the end plug of an assembled fuel rod includes: positioning an assembled fuel rod with one of its end plug-bearing opposite end portions extending into a workstation; rotating the fuel rod to locate the end plug of the fuel rod end portion at a predetermined angular reference orientation; engraving an identification symbology directly on a side of the one fuel rod end portion end plug by directing a laser beam along a first path; and engraving an enrichment symbology directly on an end surface of the one fuel rod end portion end plug by redirecting the laser beam along a second path.

Furthermore, the laser beam is directed along the first path by activating a laser to a first position to etch the identification symbology directly on the end plug side and is redirected by activating the laser to a second position to etch the enrichment symbology directly on the end plug end.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Figure 7:
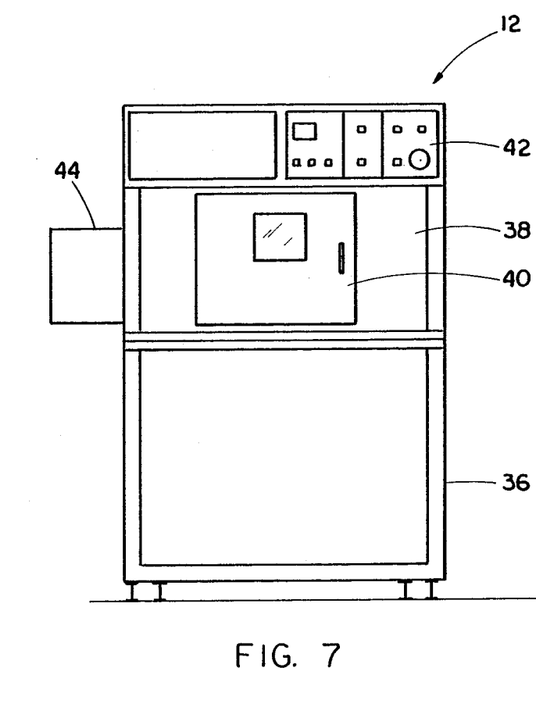
FIG. 7 is a front elevational view of the exterior of a laser marking workstation employing the apparatus for carrying out the method of the present invention.
Figure 8:
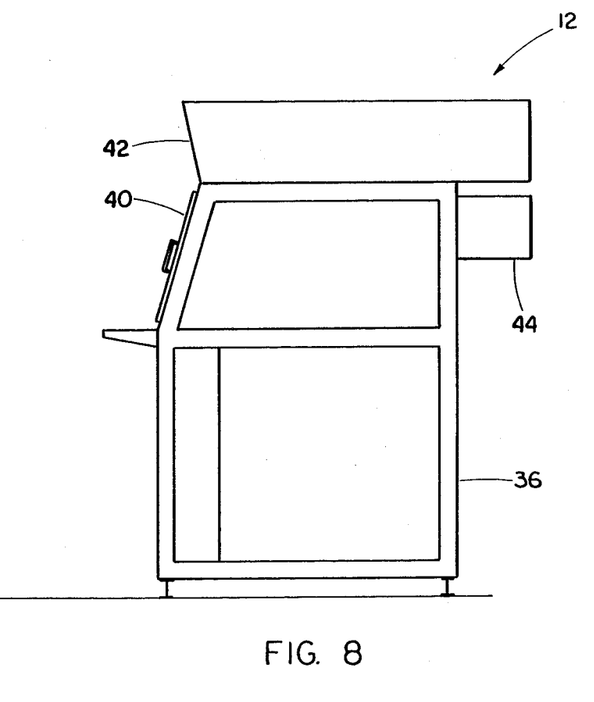
FIG. 8 is a side elevational view of the exterior of the workstation of FIG. 7.
Figure 9:
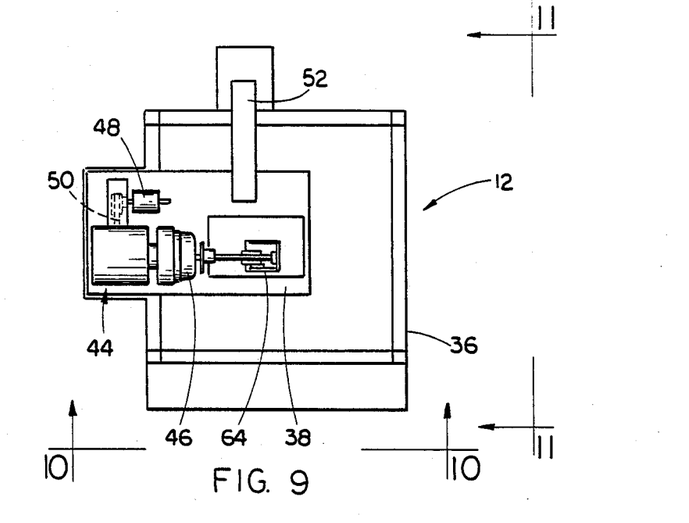
FIG. 9 is a top plan view of the workstation of FIG. 7, illustrating its components in a somewhat schematical form.
Figure 10:
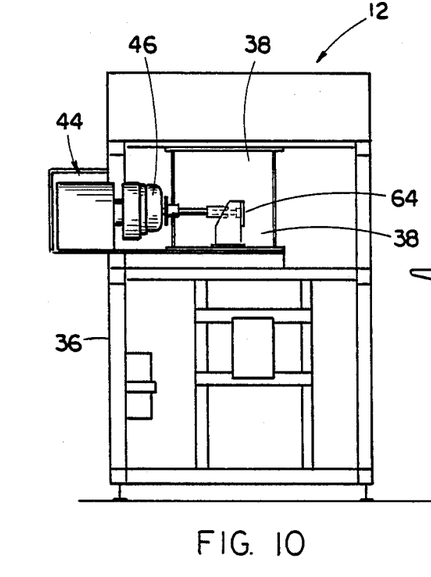
FIG. 10 is a side elevational view of the workstation as seen along line 10—10 of FIG. 9.
Figure 11:
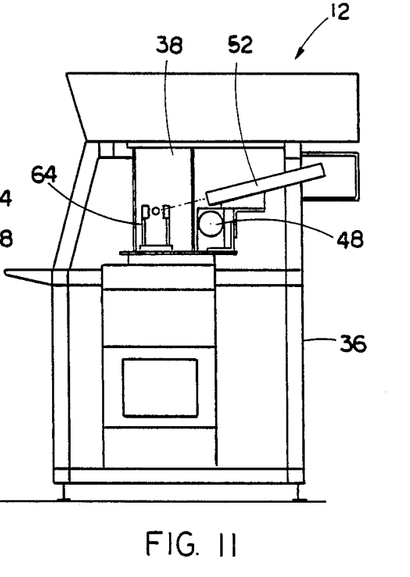
FIG. 11 is another side elevational view of the workstation as seen along line 11—11 of FIG. 9.
Figure 12:
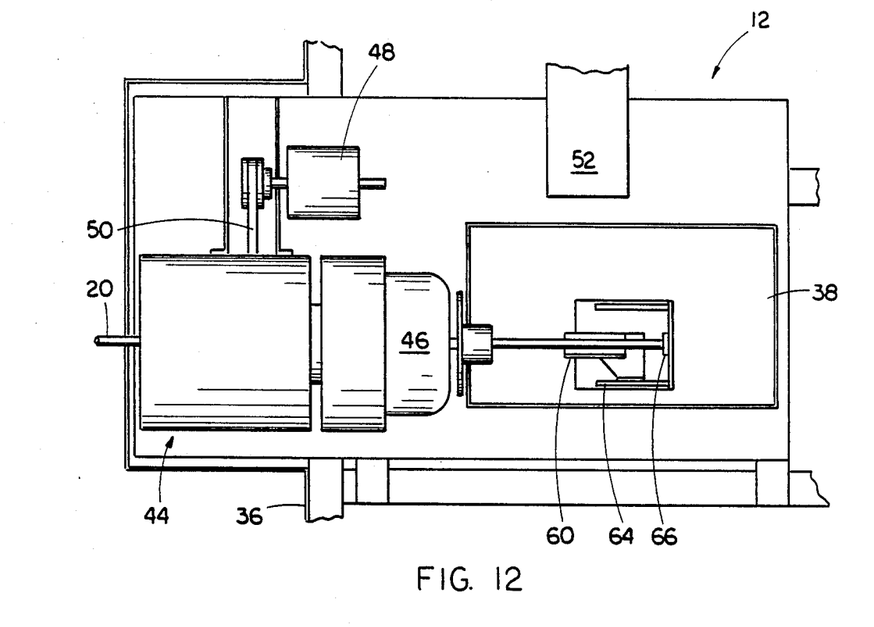
FIG. 12 is a top plan view of the workstation of FIG. 7, on a larger scale and illustrating its components in greater detail than in FIG. 9.
Figure 13:
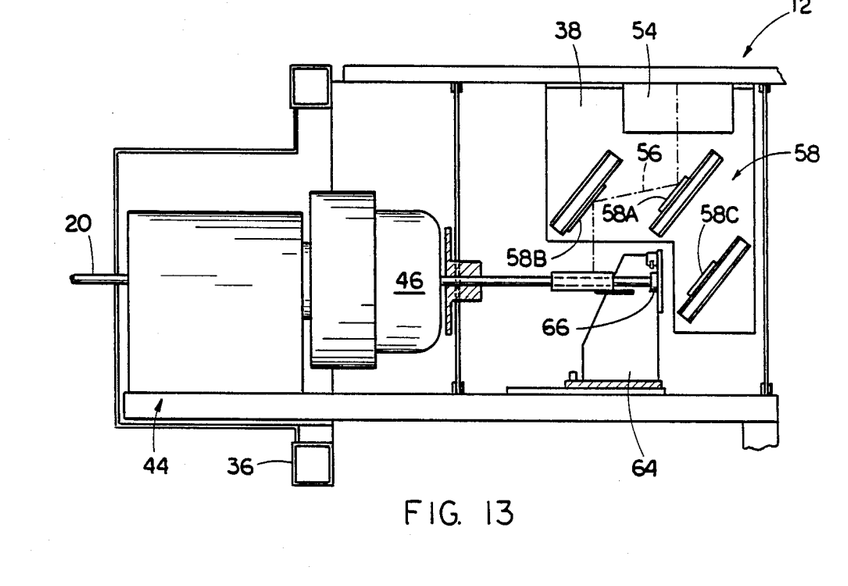
FIG. 13 is side elevational view of the workstation of FIG. 12, on a larger scale and illustrating its components in greater detail than in FIG. 10.

Referring now to the drawings, there shown a nuclear fuel rod, generally designated as 10 in FIGS. 1-6, which is appropriately marked by employment of a laser marking and reading workstation, generally designated 12 in FIGS. 7-8, of a nuclear fuel rod identification system for making the individual fuel rod 12 capable of being traced during its manufacture and subsequent use in a nuclear reactor. Although the fuel rod 10 illustrated is intended for use in a boiling water nuclear reactor (BWR), the method and apparatus of the present invention is clearly capable of use in applying indicia to fuel rods designed for other types of nuclear reactor.

The indicia applied by employment of the laser marking workstation 12 are in the form of a bar code 14 (made up of a series of spaced apart dark line of varying widths) which correspond to a specific serial number and of symbologies 16 and 18 which are numbers representing respectively the last four digits of the serial number of the bar code 14 and the specific enrichment contained in the fuel rod 10. By use of the workstation 12, the indicia are applied to the fuel rod 10 in two stages.

Figures 1, 2, 3, 4, 5, 6:
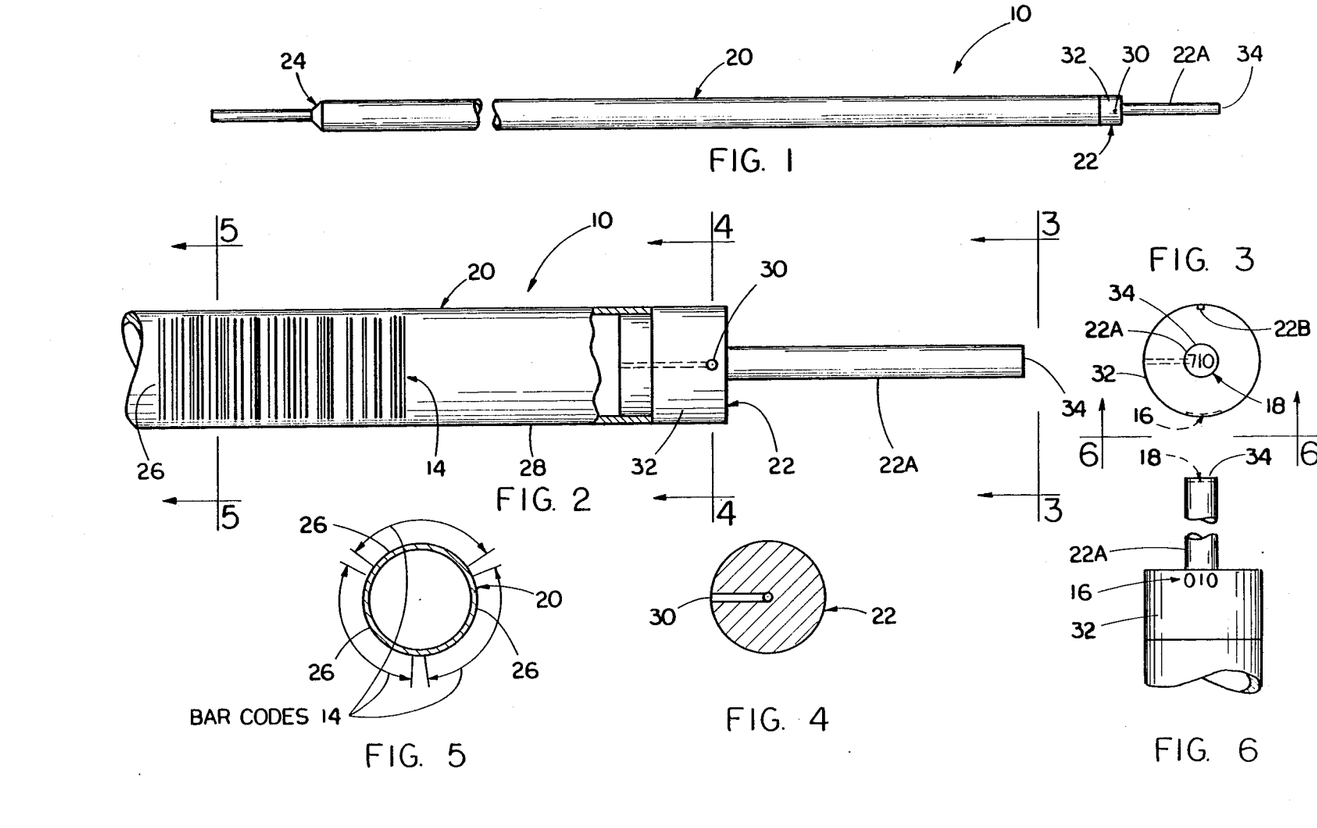
FIG. 1 is a side elevational view of a nuclear fuel rod which can be provided with identification in accordance with the principles of the present invention, the nuclear fuel rod being illustrated in longitudinally foreshorten form.
FIG. 2 is an enlarged fragmentary view of the upper end portion of the nuclear fuel rod of FIG. 1, illustrating an identification in the form of a bar code etched thereon in accordance with the principles of the present invention.
FIG. 3 is a top plan view of the fuel rod as seen along line 3—3 of FIG. 2, illustrating a symbol etched on the upper end surface of the top end plug of the nuclear fuel rod for identifying the enrichment of the nuclear fuel contained in the fuel rod.
FIG. 4 is a cross-sectional view of the upper end plug of the nuclear fuel rod taken along line 4—4 of FIG. 2.
FIG. 5 is a cross-sectional view of the upper end portion of the nuclear fuel rod taken along line 5—5 of FIG. 2.
FIG. 6 is a fragmentary side elevational view of the top end plug of the nuclear fuel rod as seen along line 6—6 of FIG. 3, with the top end plug being shown in foreshortened form and the last four numbers of the serial number of the fuel rod, as represented by the bar code thereon, etched on the side of the top end plug.

In the first stage, by using a laser beam produced and guided by components of the workstation 12, the bar code 14 is applied directly on a cladding tube 20 of the fuel rod 10 prior to loading the tube 20 with nuclear fuel and attaching top and bottom end plugs 22 and 24 to its opposite ends to complete the assembled fuel rod 10. More particularly, as will be explained in detail herein, the laser beam is used to engrave or etch the bar code 14 directly on a circumferential surface portion 26 on an upper end portion 28 of the cladding tube 20, as depicted in FIG. 2. As seen in FIG. 5, preferably the bar code 14 is etched directly on three spaced circumferential surface portions 26 of the cladding tube 20, with each bar code 14 being spaced apart circumferentially and covering slightly less than 120 degrees each.

In the second stage, after loading the nuclear fuel in the form of a stack of pellets (not shown) into the cladding tube 20, attaching the top and bottom end plugs 22, 24 to the opposite ends of the fuel rod cladding tube 20 with the bar code 14 already etched thereon, and welding shut a gas vent hole 30 in the upper end plug 22 (shown in FIGS. 2-4), by use again of the laser beam at the workstation 12 the identification and enrichment symbologies 16, 18 are engraved or etched respectively onto the side 32 and outer end surface 34 of top end plug 22 of the assembled fuel rod 10, as depicted in FIGS. 3 and 6. The top end plug 22 is marked so that the indicia thereon can be observed from above while the fuel rod 10 is installed with other fuel rods in a fuel assembly within the nuclear reactor.

Turning now to FIGS. 7-13, there is illustrated both the exterior of the laser marking and reading workstation 12 (FIGS. 7 and 8) and the components contained therein (FIGS. 9-13) which make up the apparatus of the present invention being operable for carrying out the method thereof. Basically, the workstation 12 has a floor-supported frame 36 which supports a sealed chamber 38 having an access door 40, a control panel 42 and a positioning mechanism 44. More particularly, as seen in FIG. 9-13, the positioning mechanism 44 includes a rotary chuck 46 driven by a stepping motor 48 via a drive belt 50 and being adapted to grip initially the fuel rod cladding tube 20 and subsequently the assembled fuel rod 10. Supported on its frame 36, the workstation 12 also has a laser bar code reader 52, a laser 54 for generating a laser beam 56 and an arrangement of mirrors 58 for directing the laser beam from the laser 54 to the fuel rod 10. If the rotary chuck 46 is considered to position the fuel rod 10 along a horizontal X axis, then the bar code reader 52 and laser 54 are orthogonally arranged relative to the fuel rod 10 and to one another along respective horizontal Y and vertical Z axes. Finally, the frame 36 of the workstation 12 also supports a reflector member 60 adjacent to and generally coextensive with the upper end portion 28 of the fuel rod 10 when the latter is positioned within the sealed chamber by the chuck 46. The reflector member 60 is disposed on a side of the fuel rod 10 opposite from the bar code reader 52 and defines a pair of diffuser surfaces 60A, 60B which are oppositely inclined preferably at about thirty degrees to the horizontal axis X extending between the reader 52 and the fuel rod 10, as seen in FIG. 16A.

Figure 15:
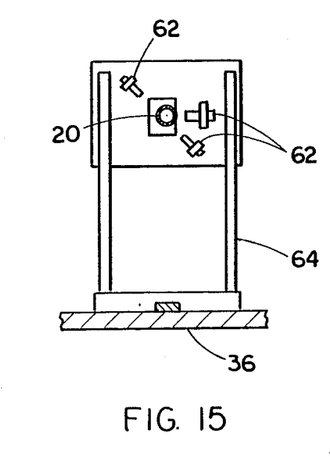
Figure 18:
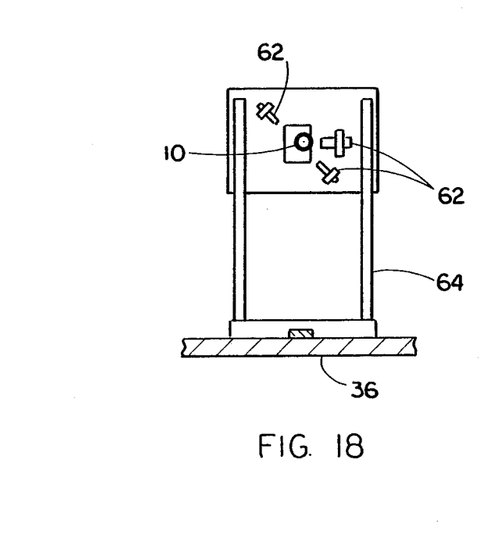

In addition to the above components but not illustrated in the drawings, the workstation 12 has associated therewith a computer electrically connected to the stepping motor 48, the reader 52 and the laser 54 for coordinating and controlling the operation thereof. Sensors 62 electrically connected to the computer and mounted on a bracket 64, as seen in FIGS. 15 and 18, are used to sense the movement of the fuel rod 10 (or cladding tube 20) to assist the computer in coordinating the operations of the motor 48, the reader 52 and the laser 54. The bracket 64 is supported on the workstation frame 36 and includes a support ring 66 which receives the elongated reduced diameter end portion 22A of the top end plug 22. Although not shown, the support ring 66 has a protuberance thereon which is capable of registering with a notch 22B defined in the top end plug 22 when the latter is correctly positioned for etching the identification symbology 16 on the side 32 thereof. The memory of the computer is loaded with a table of serial numbers matched with enrichment symbology 18 for all of the fuel rods which will be processed through the workstation 12.

In brief, the computer controls the operation of the laser to initially etch the correct bar code 14 on a cladding tube 20 representing the serial number assigned to the fuel rod 10 which will incorporate that cladding tube. Later, after the fuel rod 10 is assembled, the reader 52 will "read" the laser light reflected thereto from the bar code 14 via one of the diffuser surfaces 60A or 60B. The computer will direct the laser 54 to etch on the top end plug side 32 the last four digits of the serial number read by the reader and then match the serial number with one in its memory to select the correct enrichment symbology to etch on the top end plug end 34.

Figure 14:
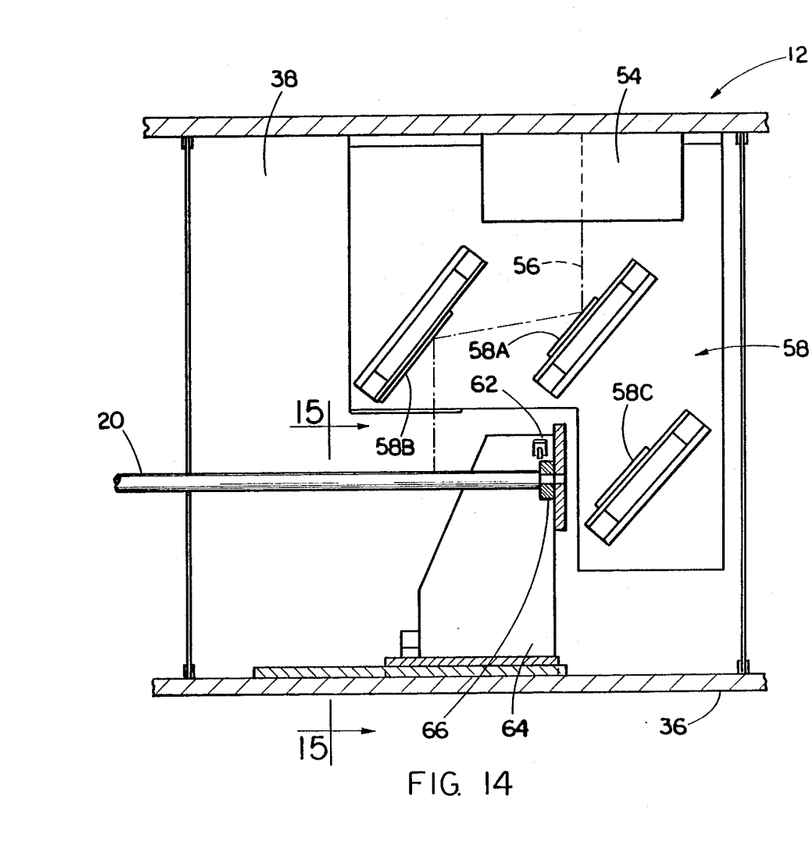
FIGS. 14 and 15 illustrate operational steps of the method of the present invention carried out by the components of the workstation constituting the apparatus of the present invention wherein the bar code is etched on the fuel rod cladding tube before loading of the nuclear fuel into the tube.

In the first stage of applying indicia to the nuclear fuel rod 10 as described previously, the bar code 14 is laser etched on the fuel rod cladding tube 20 prior to loading it with nuclear fuel and attaching the end plugs 22, 24 to opposite ends thereof to provide the assembled fuel rod 10. Referring now to FIGS. 14 and 15, there is illustrated the fuel rod cladding tube 20 positioned by the rotary chuck 46 (shown in FIGS. 12 and 13) with its upper end portion 28 extending into the sealed chamber 38 of the workstation 12. A gaseous atmosphere consisting of an argon-oxygen mixture is maintained within the sealed chamber 38. To avoid acceleration of the oxidation process of the metal surface portion 26 where the laser etching takes place as would be produced if the laser etching is performed in an atmosphere of air, an atmosphere consisting of a mixture of argon within the range of 45-85% and oxygen within the range of 15-55% must be maintained while the metal surface is at temperatures in excess of 500 degrees F. Control of the atmospheric constituents to these ranges is necessary in view that too high a level of argon will not result in a readable bar code 14, whereas too high an oxygen level may result in excessive surface oxidation with subsequent potential reduction in metal corrosion resistance.

As seen in FIG. 14, with the cladding tube 20 so positioned by the chuck 46, the laser beam 56 generated by the laser 54 is directed to the circumferential surface portion 26 at the cladding tube end portion 28 by two of the mirrors 58A and 58B of the morror arrangement 58. The computer coordinates the rotation of the chuck 46 and the operation of the laser 54 to carry out the engraving or etching of the bar code directly on the three circumferentially spaced surface portions 26 of the cladding tube end portion, as was seen in FIG. 5.

As soon as a completed signal is received by the computer, the cladding tube 20 can be removed and another one loaded into the workstation 12 for repeat of the first stage of the marking process.

In the second stage of applying indicia to the nuclear fuel rod 10 as described previously, the identification and enrichment symbologies 16, 18 are laser etched on the top end plug 22. These operations occur after loading of nuclear fuel into the cladding tube 20 and attaching of the end plugs 22, 24 to opposite ends of the cladding tube have been completed to provide the assembled fuel rod 10.

Figure 16:
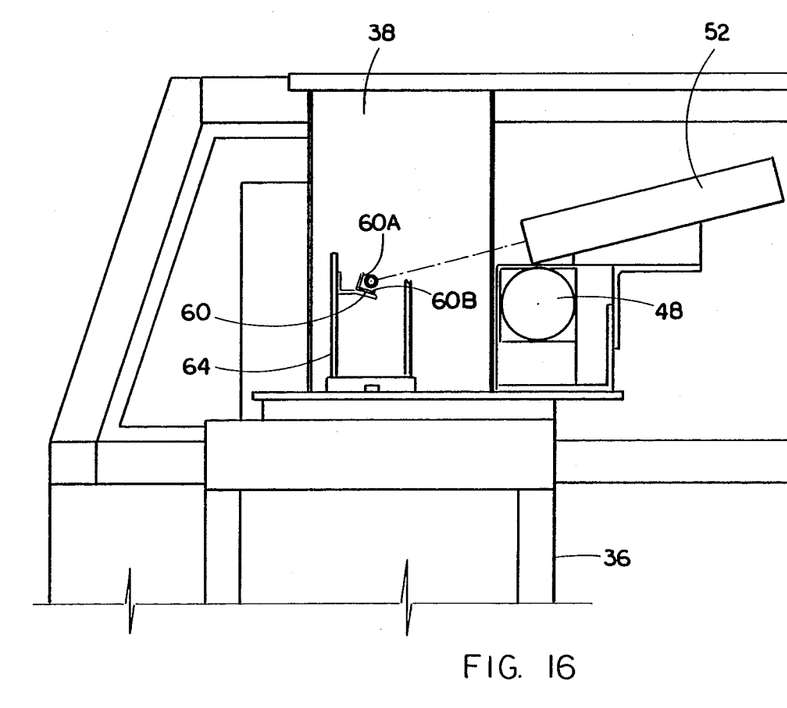
FIG. 16 illustrates the operational steps of the method of the present invention wherein the bar code of the loaded and plugged fuel rod is read to identify the rod.
Figure 16A:
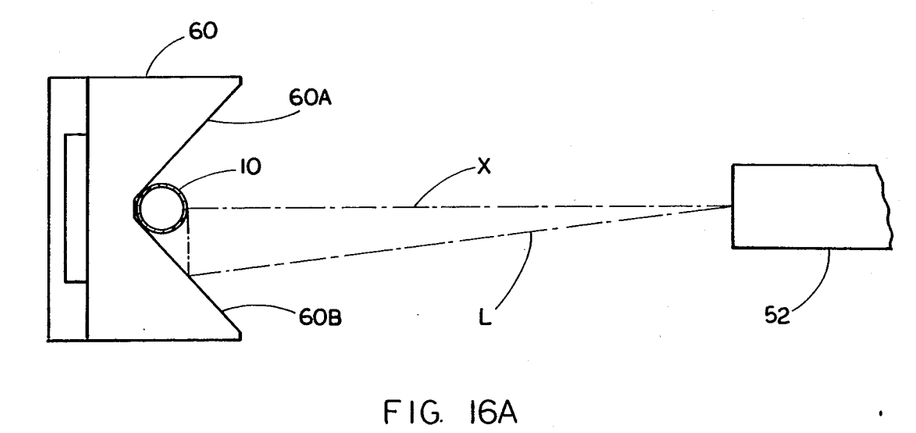
FIGS. 16A and 16B are schematical side elevational and perspective views of the operational steps and components for carrying out the steps of a method and apparatus constituting the features of the invention claimed in the copending application cross-referenced above.
Figure 16B:
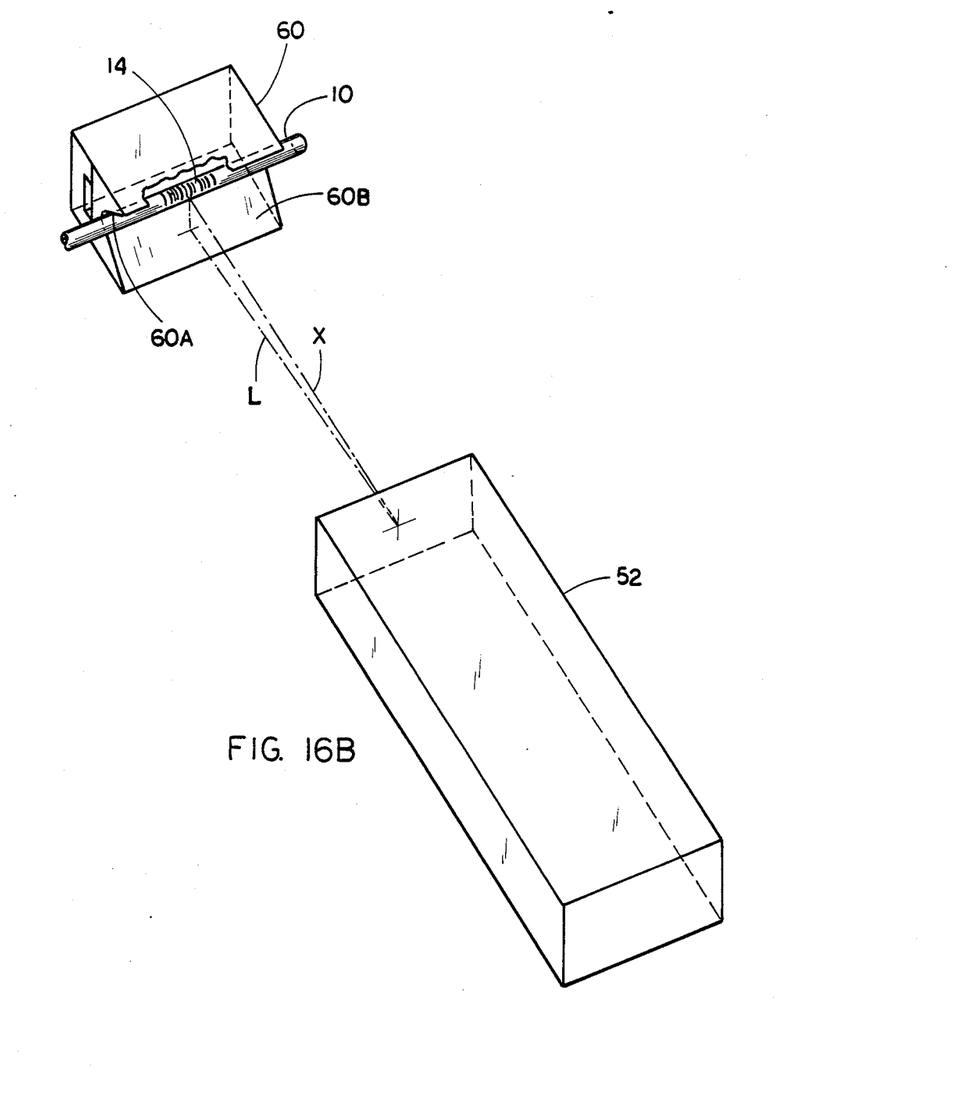

Referring now to FIGS. 16, 16A and 16B, there is illustrated the fuel rod 10 positioned by the rotary chuck 46 (shown in FIGS. 12 and 13) with its upper end portion 28 extending into the workstation 12 and located adjacent the reflector member 60 and aligned between it and the bar code reader 52 in preparation for reading of the bar code laser-etched on fuel rod end portion 28. The computer controls operation of a motor 68 which causes oscillation of the reader 52 back and forth between the centerline or X axis and a line L extending to the diffused surface 60B. The reader 52 "reads" light reflected from the surface 60B instead of directly from the shiny surface of the fuel rod 10 on which the bar code is etched. Only a fraction of the light transmitted to the fuel rod 10, about twenty-five percent, is reflected back to the reader from the thirty degree displaced (plus or minus one degree) surface 60B.

The laser bar code reader 52, a commercially-available component per se, emits a He-Ne light which is used to interpret the bar code and send an electrical signal to a decoder (not shown) which will digitize the signal. This is not possible when reading lased bar codes on shiny metal surfaces due to the reflectivity of the metal. Too much of the beam is reflected back to the interpreter in the reader which blocks the electrical signal from being received and interpreted. A diffused surface behind the fuel rod will allow a strong signal to be received by the laser reader because the reader is then viewing a reflection of the bar code onto the diffused background and will receive a signal which appears to the interpreter as a black code on a white surface. The diffused background will not reflect the original laser beam back to the reader 52 and block the electrical signal from being received. Instead, the diffusing of the laser beam decreases the amount of light being reflected and receive by the reader.

Once reading of the bar code is accomplished, the fuel rod 10 is rotated to mate the notch 22B on its top end plug 22 with the protuberance (not shown) on support ring 66 so as to locate the top end plug 22 at a predetermined angular reference orientation in the workstation 12. By this time, the computer has matched the serial number of the fuel rod determined from the bar code read by the reader 52 with the serial number and enrichment number in its memory table. Using this information, the computer then controls the laser 54 to etch the last four digits of the serial number 16 directly on the side 32 of the top end plug 22, as was depicted in FIG. 6. Specifically, the laser beam 56 is directed from the laser 54 to the fuel rod end plug 22 by the pair of mirrors 58A and 58B of the mirror arrangement 58. Next, the laser 54 is repositioned relative to the mirror arrangement 58 such that the laser beam 56 now bypasses the mirror 58A and instead strikes mirror 58C which, in turn, redirects the beam to the outer end surfaced 34 of the top end plug 22. The computer now controls the laser 54 to engrave or etch the enrichment symbology 18 directly on the end surface 34 of the fuel rod end plug 22, as was shown in FIG. 3.

Figure 17:
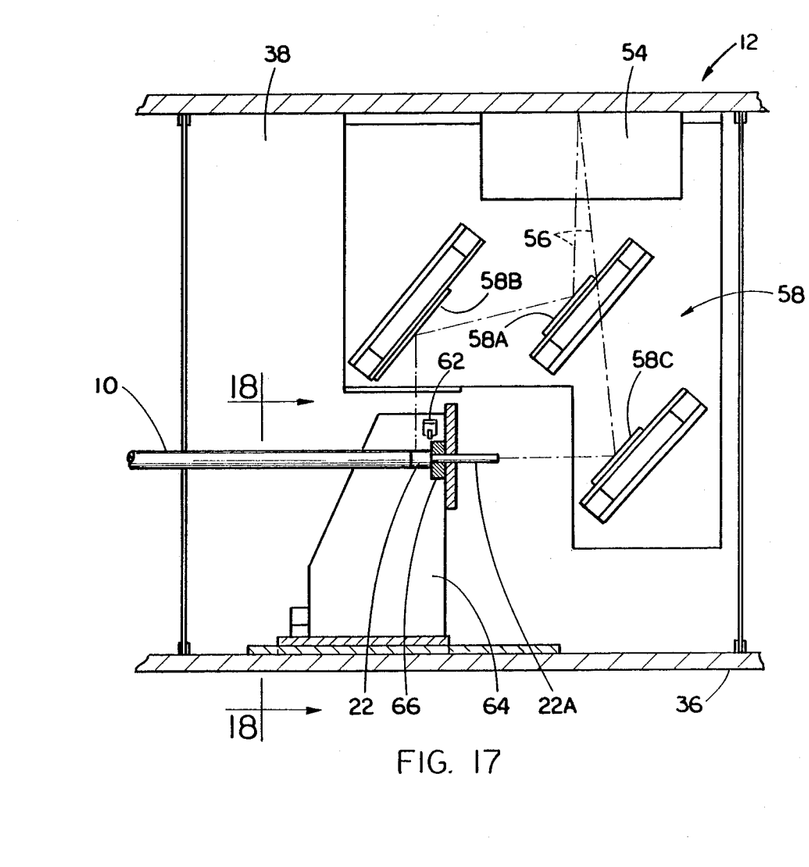
FIGS. 17 and 18 illustrate the operational steps of the method of the present invention carried out by the components of the workstation constituting the apparatus of the present invention wherein the identification and enrichment symbologies are etched on the side and end surface of the top end plug of the fuel rod after loading and plugging of the same.

As soon as a completed signal is received by the computer, the fuel rod 10 can be removed and another one loaded into the workstation 12 for repeat of the second stage of the marking process.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

What is claimed is:

1. In a nuclear fuel rod identification system, a method of applying a bar code on a fuel rod cladding tube, comprising the steps of:
   (a) positioning a fuel rod cladding tube with its end portion extending into a sealed chamber of a workstation;
   (b) maintaining a gaseous atmosphere substantially consisting of an argon-oxygen mixture within the sealed chamber; and
   (c) engraving a bar code directly on a circumferential surface portion of the cladding tube end portion.

2. The applyiny method as recited in claim 1, wherein said engraving step includes etching a bar code directly on the circumferential surface portion of the cladding tube by using a beam of a laser.

3. The applying method as recited in claim 1, wherein said engraving step includes:
   rotating the fuel rod cladding tube; and
   simultaneously with said rotating, etching a bar code directly on the circumferential surface portion of the cladding tube end portion.

4. The applying method as recited in claim 3, wherein said etching step is carried out by using a beam of a laser.

5. The applying method as recited in claim 1, wherein said engraving step includes:
   etching the bar code directly on spaced circumferential surface portions of the cladding tube end portion with each bar code being circumferentially spaced apart and covering slightly less than 120 degrees each.

6. The applying method as recited in claim 5, wherein said etching step is carried out by using a beam of a laser.

7. The applying method as recited in claim 5, wherein said engraving step further includes:
   rotating the fuel rod cladding tube simultaneously with said etching of the bar code directly on the circumferential surface portions of the cladding tube end portion.

8. The applying method as recited in claim 1, wherein said maintaining step includes:
   maintaining argon within the range of 45-85 percent and oxygen within the range of 15-55 percent.

9. In a nuclear fuel rod identification system, apparatus for applying a bar code on a fuel rod cladding tube, comprising:
   (a) a workstation having a sealed chamber containing a gaseous atmosphere substantially consisting of an argon-oxygen mixture;
   (b) means for positioning a fuel rod cladding tube with its end portion extending into said sealed chamber; and
   (c) means for engraving a bar code directly on a circumferential surface portion of the cladding tube end portion.

10. The applying apparatus as recited in claim 9, wherein said engraving means includes means for etching the bar code directly on the surface portion of the cladding tube end portion by use of a laser beam.

11. The applying apparatus as recited in claim 9, wherein said engraving means includes:
   means for rotating the fuel rod cladding tube; and
   means for etching the bar code directly on the circumferential surface portion of the cladding tube end portion, said etching means being operable simultaneously with operation of said rotating means.

12. The applying apparatus as recited in claim 10, wherein said etching means is operable for producing a laser beam being adapted to etch the bar code directly on the surface portion of the cladding tube end portion.

13. The applying apparatus as recited in claim 9, wherein said engraving means includes:
   means for etching the bar code directly on spaced circumferential surfaces portions of the cladding tube end portion each with each bar code being circumferentially spaced apart and covering slightly less than 120 degrees each.

14. The applying apparatus as recited in claim 13, wherein said etching means is operable for producing a laser beam being adapted to etch the bar code directly on the surface portion of the cladding tube end portion.

15. The applying apparatus as recited in claim 13, wherein said engraving means further includes:
means for rotating the fuel rod cladding tube, said rotating means being operable simultaneously with operation of said etching means.

16. The applying apparatus as recited in claim 9, wherein in said atmosphere within said sealed chamber argon is within the range of 45–85 percent and oxygen is within the range of 15–55 percent.

17. In a nuclear fuel rod identification system, a method of applying symbology on an end plug of an assembled fuel rod, comprising the steps of:
(a) positioning an assembled fuel rod with one of its end plug-bearing opposite end portions extending into a workstation;
(b) rotating the fuel rod to locate the end plug of the fuel rod end portion at a predetermined angular reference orientation; and
(c) engraving an identification symbology directly on a side of the one fuel rod end portion end plug.

18. The applying method as recited in claim 17, wherein said engraving step includes etching said symbology directly on the end plug side by using a beam of a laser.

19. The applying method as recited in claim 17, further comprising:
(d) engraving an enrichment symbology directly on an end surface of the one fuel rod end portion end plug.

20. The applying method as recited in claim 19, wherein said engraving step includes etching said respective symbololgies directly on the end plug side and end by using a beam of a laser.

21. The applying method as recited in claim 20, wherein said laser beam is directed to etch said identification symbology directly on the end plug side and is then redirected to etch said enrichment symbology directly on the end plug end.

22. In a nuclear fuel rod identification system, apparatus for applying identification symbology on an end plug of an assembled fuel rod, comprising:
(a) a workstation;
(b) means for positioning an assembled fuel rod with one of its end plug-bearing opposite end portions extending into said workstation;
(c) means for rotating the fuel rod to locate the end plug of the fuel rod end portion at a predetermined angular reference orientation; and
(d) means for engraving an identification symbology directly on a side of the one fuel rod end portion end plug.

23. The applying apparatus as recited in claim 22, wherein said engraving means includes means for etching said symbology directly on the end plug side by use of a laser beam.

24. The applying apparatus as recited in claim 22, further comprising:
(e) said engraving means being further operable for engraving an enrichment symbology directly on an end surface of the one fuel rod end portion end plug.

25. The applying apparatus as recited in claim 24, wherein said engraving means includes means for etching said respective symbololgies directly on the end plug side and end by use of a laser beam.

26. The applying apparatus as recited in claim 25, wherein said engraving means further includes an arrangement of mirrors for directing said laser beam from said etching means to said fuel rod end portion end plug.

27. The applying apparatus as recited in claim 26, wherein a laser beam generating means is activable to a first position for directing said laser beam via some of said mirrors to etch said identification symbology directly on the end plug side and to a second position for redirecting said laser beam via other of said mirrors to etch said enrichment symbology directly on the end plug end.

28. In a nuclear fuel rod identification system, a method of providing identification indicia on a nuclear fuel rod, comprising the steps of:
(a) applying a bar code on a fuel rod cladding tube prior to loading it with nuclear fuel and attaching plugs to opposite ends thereof to provide an assembled fuel rod; and
(b) after loading nuclear fuel into and attaching end plugs to opposite ends of the fuel rod cladding tube with the applied bar code to provide an assembled fuel rod, applying identification and enrichment symbology to one of the end plugs of the assembled fuel rod.

29. The indicia providing method as recited in claim 28, wherein said bar code applying step includes:
positioning a fuel rod cladding tube with its end portion extending into a sealed chamber of a workstation;
maintaining a gaseous atmosphere substantially consisting of an argon-oxygen mixture within the sealed chamber; and
engraving a bar code directly on a circumferential surface portion of the cladding tube end portion.

30. The indicia providing method as recited in claim 29, wherein said engraving step includes etching a bar code directly on the circumferential surface portion of the cladding tube by using a beam of a laser.

31. The indicia providing method as recited in claim 29, wherein said engraving step includes:
rotating the fuel rod cladding tube; and
simultaneously with said rotating, etching a bar code directly on the circumferential surface portion of the cladding tube end portion.

32. The indicia providing method as recited in claim 31, wherein said etching step is carried out by using a beam of a laser.

33. The indicia providing method as recited in claim 29, wherein said engraving step includes:
etching the bar code directly on spaced circumferential surface portions of the cladding tube end portion with each bar code being circumferentially spaced apart and covering slightly less than 120 degrees each.

34. The indicia providing method as recited in claim 29, wherein said etching step is carried out by using a beam of a laser.

35. The indicia providing method as recited in claim 29, wherein said engraving step further includes:
rotating the fuel rod cladding tube simultaneously with said etching of the bar code directly on the circumferential surface portions of the cladding tube end portion.

36. The indicia providing method as recited in claim 29, wherein said maintaining step includes:
    maintaining argon within the range of 45-85 percent and oxygen within the range of 15-55 percent.

37. The indicia providing method as recited in claim 28, wherein said symbology applying step includes:
    positioning an assembled fuel rod with one of its end plug-bearing opposite end portions extending into a workstation;
    rotating the fuel rod to locate the end plug of the fuel rod end portion at a predetermined angular reference orientation; and
    engraving an identification symbology directly on a side of the one fuel rod end portion end plug.

38. The indicia providing method as recited in claim 37, wherein said engraving step includes etching said identification symbology directly on the end plug side by using a beam of a laser.

39. The indicia providing method as recited in claim 37, further comprising:
    engraving an enrichment symbology directly on an end surface of the one fuel rod end portion end plug.

40. The indicia providing method as recited in claim 39, wherein said engraving step includes etching said respective symbololgies directly on the end plug side and end by using a beam of a laser.

41. The indicia providing method as recited in claim 40, wherein said laser beam is generated by a laser and directed by an arrangement of mirrors to etch said identification symbology directly on the end plug side and is redirected by the laser and arrangement of mirrors to etch said enrichment symbology directly on the end plug end.

42. In a nuclear fuel rod identification system, a method of providing identification indicia on a nuclear fuel rod, comprising the steps of:

(a) applying a bar code on a fuel rod cladding tube prior to loading it with nuclear fuel and attaching plugs to opposite ends thereof to provide an assembled fuel rod, said bar code applying including the steps of
  (i) positioning a fuel rod cladding tube with its end portion extending into a sealed chamber of a workstation,
  (ii) maintaining a gaseous atmosphere substantially consisting of an argon-oxygen mixture within the sealed chamber, and
  (iii) directing a laser beam along a path for laser engraving a bar code directly on a circumferential surface portion of the cladding tube end portion; and (b) after loading nuclear fuel into and attaching end plugs to opposite ends of the fuel rod cladding tube with the applied bar code to provide an assembled fuel rod, applying symbology to one of the end plugs of the assembled fuel rod, said symbology applying including the steps of
  (i) positioning an assembled fuel rod with its bar code-etched end portion extending into the workstation,
  (ii) reading the bar code laser-etched on fuel rod end portion,
  (iii) rotating the fuel rod to locate the end plug at a predetermined angular reference orientation,
  (iv) directing a laser beam along a first path for laser engraving an identification symbology directly on a side of the end plug, said identification symbology corresponding to said bar code read from said fuel rod end portion, and
  (v) redirecting the laser beam along a second path for laser engraving an enrichment symbology directly on an end surface of the end plug.

* * * * *